(12) United States Patent
Coignet et al.

(10) Patent No.: US 10,543,462 B2
(45) Date of Patent: Jan. 28, 2020

(54) HOLLOW FIBER CARBON MOLECULAR SIEVE MEMBRANES AND METHOD OF MANUFACTURING USING RADIAL-FLOW PYROLYSIS

(71) Applicant: L'Air Liquide, Societe Anonyme pour l'Etude et l'Exploitation des Procedes Georges Claude, Paris (FR)

(72) Inventors: Philippe A. Coignet, Bear, DE (US); Dean W. Kratzer, Warwick, MD (US); Raja Swaidan, Bear, DE (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 436 days.

(21) Appl. No.: 15/394,204

(22) Filed: Dec. 29, 2016

(65) Prior Publication Data
US 2018/0161731 A1 Jun. 14, 2018

Related U.S. Application Data

(63) Continuation-in-part of application No. 15/378,233, filed on Dec. 14, 2016.

(51) Int. Cl.
*B01D 67/00* (2006.01)
*B01D 69/08* (2006.01)
(Continued)

(52) U.S. Cl.
CPC ....... *B01D 67/0067* (2013.01); *B01D 53/228* (2013.01); *B01D 69/08* (2013.01);
(Continued)

(58) Field of Classification Search
CPC .. B01D 67/0067; B01D 53/00; B01D 53/228; B01D 69/08; B01D 71/021;
(Continued)

(56) References Cited

U.S. PATENT DOCUMENTS

| 4,670,145 A | 6/1987 | Edwards |
| 5,925,591 A * | 7/1999 | Soffer ................. B01D 63/02 |
| | | 423/445 R |

(Continued)

FOREIGN PATENT DOCUMENTS

WO   WO 2013/165866   11/2013

OTHER PUBLICATIONS

Kim, Y.K., et al, Carbon molecular sieve membranes derived from metal-substituted sulfonated polyimide and their gas separation properties. Journal of Membrane Science, vol. 226, 2003, 45-158.

(Continued)

*Primary Examiner* — Stella K Yi
(74) *Attorney, Agent, or Firm* — Christopher J. Cronin

(57) ABSTRACT

One or more polymeric hollow fiber membranes are pyrolyzed to form one or more hollow fiber CMS membranes by directing a flow of pyrolysis gas through a bundle of polymeric membranes (including a plurality of green, polymeric hollow fiber membranes oriented so that their ends are disposed with ends of the bundle) in a direction perpendicular to a length direction of the bundle in order to sweep away off-gases that are formed during pyrolysis.

11 Claims, 12 Drawing Sheets

(51) Int. Cl.
*B01D 71/02* (2006.01)
*B01D 53/22* (2006.01)

(52) U.S. Cl.
CPC ...... *B01D 71/021* (2013.01); *B01D 2053/224* (2013.01); *B01D 2323/08* (2013.01)

(58) Field of Classification Search
CPC .. B29C 2045/14524; B29C 2045/1724; B29C 65/78; B29C 66/40; B29C 66/432; B29C 66/50; B29C 66/51; B29C 66/53; B29C 66/532; B29C 70/742
See application file for complete search history.

(56) References Cited

U.S. PATENT DOCUMENTS

| | | |
|---|---|---|
| 6,565,631 B2 | 5/2003 | Koros et al. |
| 2013/0152793 A1 | 6/2013 | Bhuwania et al. |
| 2013/0305921 A1 | 11/2013 | Kiyono et al. |

OTHER PUBLICATIONS

Robeson L. M., The Upper Bound Revisited, Journal of Membrane Science, vol. 320, 2008, 390-400.
International Search Report and Written Opinion for PCT/US2017/066420, dated Mar. 7, 2018.

\* cited by examiner

HOLLOW FIBER CARBON MOLECULAR SIEVE MEMBRANES AND METHOD OF MANUFACTURING USING RADIAL-FLOW PYROLYSIS

CROSS-REFERENCE TO RELATED APPLICATIONS

This application claims the benefit of priority under 35 U.S.C. § 120 to U.S. Non-Provisional patent application Ser. No. 15/378,233 filed Dec. 14, 2016, the entire contents of which are incorporated herein by reference.

BACKGROUND

Field of the Invention

The present invention relates to carbon molecular sieve membranes and gas separations utilizing the same.

Related Art

Membranes are often preferred to other gas separation techniques in industry due to the following advantages. The energy consumption for membranes is low as they do not require a phase change for separation. Membrane modules are compact, thereby reducing their footprint and capital cost. Membranes are also mechanically robust and reliable because they have no moving parts.

Polymer membranes in particular are used in a wide variety of industrial applications. They enable the production of enriched nitrogen from air. They separate hydrogen from other gases in refineries. They are also used to remove carbon dioxide from natural gas.

However, owing to the manufacturing processes and material structure, today's polymeric membranes cannot reach both high selectivities and permeabilities, because a trade-off exists between permeability and selectivity. Robeson formulated semi-empirical upper-bound trade-off lines for several gas pairs. (Robeson, "The upper bound revisited", Journal of Membrane Science 2008, vol 320, pp 390-400 (2008)). Carbon membranes exceed this upperbound and therefore are quite promising.

Carbon molecular sieve membranes (CMS membranes) may be obtained by high-temperature pyrolysis under oxygen-deficient atmospheres of polymer precursors. They offer attractive gas separation properties relative to the precursor polymer mainly characterized by higher permeance, higher selectivity, a tolerance to higher process gas temperatures, and a resistance to plasticization-induced selectivity losses due to condensable components in gas feeds. That is, CMS membranes bypass the traditional tradeoffs between permeability and selectivity that polymer membranes suffer from, yielding simultaneously higher productivity and higher product purity. To further improve the module productivity per unit volume, the membranes can be produced with a hollow fiber configuration. Together with plasticization resistance, these properties render CMS hollow-fiber membranes ideal candidates for many separations, including natural gas upgrading and olefin/paraffin separations.

In conventional methods, the gas used during pyrolysis serves several objectives: application of heat or cooling, introduction of doping agents in order to tune the fiber properties, and evacuation of the off-gases (i.e., the by-products of the chemical reactions occurring during pyrolysis). With regard to application of heat or cooling, it is ideal to pyrolyze the precursor membranes under relatively high pyrolysis gas flow rates so as to promote temperature homogeneity within the pyrolyzing fibers. However, the fibers may be entrained and/or distorted under such flow rates, and beyond a limit gas velocity, may become fluidized within the flow of pyrolysis gas.

Conventional pyrolysis techniques, such as that disclosed by Kim, et al., call for the introduction of the pyrolysis gas (at a flow of rate of 200 $cm^3$(std)/min) at one end of a quartz tube in a furnace and withdrawal of the pyrolysis gas from an opposite end of the tube. Kim, et al., "Carbon molecular sieve membranes derived from metal-substituted sulfonated polyimide and their gas separation properties", Journal of Membrane Science 226 (2003) 145-158. The pyrolysis gas is therefore swept across the tube across the (flat film) pyrolyzing membranes. Many others have disclosed similar techniques.

Large amounts of reactive off-gases (e.g., CO) are released during pyrolysis of large numbers of the fibers. These gases can react back onto the fibers with potentially detrimental effects. Conventional pyrolysis techniques promote non-homogeneity in terms of off-gases concentration along the length of the pyrolyzing membrane. Specifically, the pyrolysis gas entering the pyrolysis chamber is at first "clean" of off-gases. As the pyrolysis gas travels along the length of the membranes though the chamber, the pyrolysis gas entrains reactive off-gases. As an extreme example, each portion of the membrane downstream of the portion of the membrane that is swept by the "clean" pyrolysis gas is therefore subjected to increasing amounts of entrained off-gas released from the upstream end. As a result, downstream portions of the membrane are not subjected to the same gaseous environment as upstream portions are. This non-homogeneity of off-gas concentration ultimately can result in non-homogenous CMS fiber properties.

Therefore, there is a need for a new pyrolysis technique in which non-homogeneous CMS fiber properties caused by the reaction between pyrolysis off-gases and the pyrolyzing fibers are inhibited.

We are not aware of any publication disclosing the pyrolysis of hollow fiber precursor membranes in which the pyrolysis chamber is illustrated. Nevertheless, if hollow fiber membranes are pyrolyzed according to the above-described conventional techniques, the resulting hollow fiber CMS membranes would similarly be expected to possess non-homogeneous properties.

Therefore, there is a need for a new pyrolysis technique for precursor membranes in hollow fiber form.

SUMMARY

There is disclosed a method for manufacturing at least one hollow fiber CMS membrane that comprises the following steps. A polymeric membrane cartridge or a bundle of polymeric membranes is heated, in a pyrolysis chamber. The polymeric membrane cartridge comprises a porous center tube around which one or more green, polymeric, hollow fiber membranes is arranged and has a length dimension that is greater than its width, thickness, and radius dimensions. The bundle of polymeric membranes comprises a plurality of green, polymeric hollow fiber membranes oriented so that first and second ends of the green, polymeric hollow fiber membranes are disposed at first and second ends of the bundle. The bundle of polymeric membranes has a length dimension that is greater than its width and thickness dimensions. The porous tube has at least one open end and apertures extending through a wall thickness of the porous tube. Said heating step is performed at a temperature and time duration sufficient to pyrolyze the membranes. A flow of pyrolysis gas is directed during said heating step past said cartridge or bundle in a direction perpendicular to the length direction of the cartridge or bundle, wherein performance of said heating step results in the production of pyrolysis off-gases and said flow of pyrolysis gas sweeps the pyrolysis off-gases away from the green, polymeric, hollow fiber membrane(s).

There is also disclosed a method of manufacturing a hollow fiber CMS membrane module that comprises the following steps. A polymeric membrane cartridge is heated in a pyrolysis chamber. The polymeric membrane cartridge comprises a porous center tube around which one or more green, polymeric, hollow fiber membranes is arranged. The polymeric membrane cartridge has a length dimension that is greater than its width, thickness, and radius dimensions. The porous tube has at least one open end and apertures extending through a wall thickness of the porous tube. Said heating step is performed at a temperature and time duration sufficient to pyrolyze the membranes. A flow of pyrolysis gas is directed during said heating step through the one or more green, polymeric hollow fiber membranes in either an outwardly radial direction from an interior of the center tube or in an inwardly radial direction toward the interior of the center tube. Performance of said heating step results in the production of pyrolysis off-gases and said radial flow pyrolysis gas sweeps the pyrolysis off-gases away from the green, polymeric, hollow fiber membrane(s). One or more tubesheets are formed on a CMS membrane cartridge resulting from said steps of heating and directing. Following said forming step, the CMS membrane cartridge is placed inside a pressure vessel having a feed port, a permeate port, and a non-permeate port, wherein the center tube is in fluid communication with either the permeate port, the non-permeate port, or the feed gas port.

Either or both of the methods may include one or more of the following aspects:

said heating step comprises heating, in a pyrolysis chamber, a polymeric membrane cartridge.

the pyrolysis gas does not flow through the cartridge in a direction parallel to the center tube axis.

the cartridge is contained within an outer shell having an axis coextensive with the center tube axis.

the pyrolysis gas is introduced into an interior of the center tube from the at least one open end, flows outwardly in the radial direction past the at least one membrane via the apertures, and is withdrawn, along with the swept pyrolysis off-gases, from a space between the bundle and the outer shell.

the space between the bundle and the outer shell is swept with an axial flow of a sweep gas in order to enhance removal of the pyrolysis gas and swept pyrolysis off-gases therefrom.

a vacuum is applied to the space between the bundle and the outer shell in order to enhance removal of the pyrolysis gas and swept pyrolysis off-gases therefrom.

a porous sleeve surrounds the bundle, and along with the swept off-gases, the radial flow of pyrolysis gas travels through apertures formed in the sleeve.

the porous sleeve is comprised of a metal, a carbon fiber material, or a polymeric material, the polymeric material having a melting, softening, or pyrolysis temperature higher than that achieved during said heat step.

the pyrolysis gas is introduced into a space between the bundle and the outer shell, and along with the swept off-gases, flows inwardly in the radial direction past the at least one membrane through the apertures of the porous tube and into an interior of the porous tube where they are withdrawn therefrom.

the interior of the porous tube is swept with an axial flow of a sweep gas in order to enhance removal of the pyrolysis gas and swept pyrolysis off-gases therefrom.

a vacuum is applied to the interior of the porous tube in order to enhance removal of the pyrolysis gas and swept pyrolysis off-gases therefrom.

a porous sleeve surrounds the bundle and the radial flow of pyrolysis gas travels through apertures formed in the sleeve.

the porous sleeve is comprised of a metal, a carbon fiber material, or a polymeric material, the polymeric material having a melting, softening, or pyrolysis temperature higher than that achieved during said heat step.

the porous center tube is comprised of a metal.

the porous center tube is comprised of a sintered metal.

said at least one green, polymeric, hollow fiber membrane is wound around the center tube.

cartridge includes more than 1,000 green, polymeric, hollow fiber membranes, each one of which extends in a direction parallel to the porous center tube axis.

said heating step comprises heating, in a pyrolysis chamber, a bundle of polymeric membranes; and the flow of pyrolysis gas is directed across a thickness dimension of the bundle.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

GLOSSARY

Figure 1:
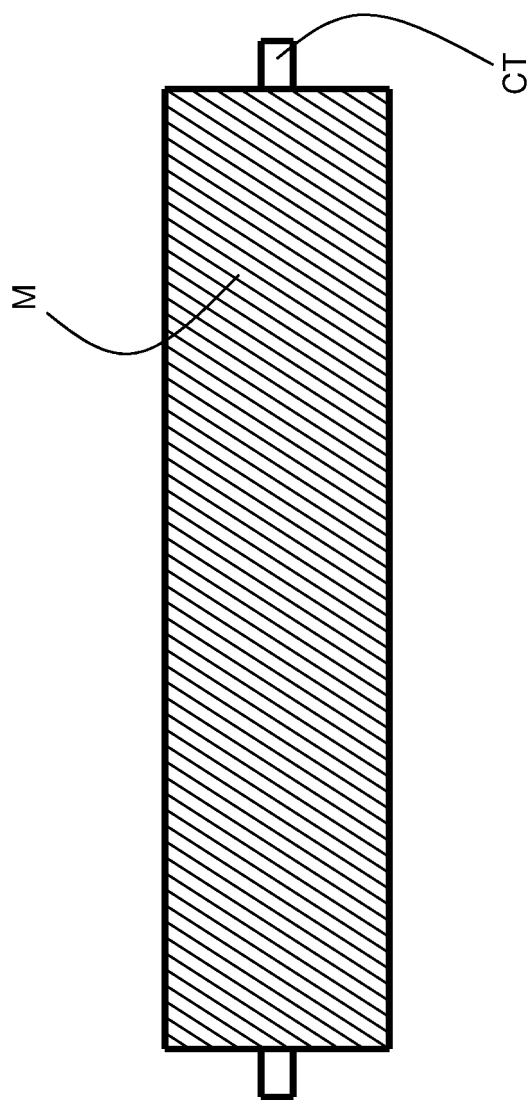
FIG. 1 is side elevation view of one particular configuration of polymeric membrane cartridge.

A green, polymeric, hollow fiber membrane is a non-pyrolyzed flexible element that has a width and thickness of a same order of magnitude wherein the length is much greater than the width or thickness. It has a hollow bore extending through its center along its length to define a fiber wall extending between a peripheral surface of the fiber and the bore. It is primarily comprised of a polymeric material. It includes a separation layer made of a polymeric material that is adapted and configured and constituted to effect separation of gases in a gas mixture fed to one side of the fiber wall. Those of ordinary skill in the art of hollow fiber CMS membranes will understand that the term "green" refers to a pre-pyrolyzed state and not a color of the fiber.

A CMS hollow fiber membrane is a green, polymeric, hollow fiber membrane that has been pyrolyzed to a desired degree and which is adapted and configured and constituted to effect separation of gases in a gas mixture fed to one side of the fiber wall.

A polymeric membrane cartridge is the combination of one or more green, polymeric hollow fiber membranes arranged around the circumference of a center tube wherein each of a plurality of membranes extends in a direction parallel to an axis of the center tube or wherein the one or more membranes is wound around the center tube. A polymeric membrane cartridge has a length dimension that is greater than any of its width, thickness, or radius dimensions.

A bundle of polymeric membranes is a collection of green, polymeric hollow fiber membranes substantially aligned with one another so as to dispose first ends of the membranes at a first end of the bundle and dispose second ends of the membranes at a second end of the bundle. A bundle of polymeric membranes has a length dimension that is greater than any of its width, thickness, or radius dimensions.

A hollow fiber CMS membrane cartridge is a polymeric membrane cartridge that has been pyrolyzed to carbonize the polymeric material of the one or more green, polymeric hollow fibers to a desired degree, wherein each of the separation layers following pyrolysis is adapted and configured and constituted to effect separation of gases in a gas mixture fed to one side of the fiber wall.

A bundle of hollow fiber CMS membranes is a bundle of polymeric membranes that has been pyrolyzed to carbonize the polymeric material of the green, polymeric hollow fiber membranes to a desired degree, wherein each of the separation layers following pyrolysis is adapted and configured and constituted to effect separation of gases in a gas mixtures fed to one side of the fiber wall.

A CMS gas separation membrane module is an apparatus adapted and configured to separate gases that includes a hollow fiber CMS membrane cartridge or a bundle of CMS membranes.

DESCRIPTION OF PREFERRED EMBODIMENTS

According to the invention, instead of flowing in an axial direction along an axis of green, polymeric hollow fibers, pyrolysis gas is caused to flow in a direction perpendicular to the length dimension of either a polymeric membrane cartridge or a bundle of polymeric membranes. In the case of a polymeric membrane cartridge, the pyrolysis gas flows radially through the cartridge either outwardly from the center tube or inwardly toward the center tube. In the case of a bundle of polymeric membranes, the pyrolysis gas flows through perpendicular to the bundle length from either below the bundle to above the bundle or from one side of the bundle to an opposite side of the bundle. Those skilled in the art will recognize that the perpendicularity of the direction of the flow of pyrolysis gas with respect to the length dimension is not limited to an angle of 90°, but may vary slightly below or above 90° such as, for example, between 80-100°.

For a given linear velocity for a flow of pyrolysis gas, this type of flow pattern minimizes the residence time for contact between pyrolysis off-gases and the cartridge or bundle and therefore reduces the chance that detrimental reactions between the off-gas and the surfaces of the fiber(s) will occur. The residence time is minimized because the farthest distances that an off-gas will travel is across a cross-section of less than half the cartridge or across a cross-section of the bundle. In contrast and again for a given linear velocity, in conventional techniques the pyrolysis gas sweeps across the entire length of the polymeric membranes so that a plug of pyrolysis gas and increasing amounts of off-gases travels across the entire length of the polymeric membranes thereby greatly increasing opportunities for reactions between the off-gases and the surfaces of the fibers.

While the polymeric membrane cartridge of the invention is not limited to any particular orientation of the green fibers around the centrally disposed porous center tube, typically the green fibers are oriented in one of two configurations.

In one embodiment and as shown in FIG. 1, the polymeric membrane cartridge may be formed by winding the green, polymeric, hollow fiber membranes M around the porous center tube CT in a manner well-known in the field of hollow fiber gas separation membranes. This cartridge structure is typically achieved by feeding a continuous length of the membrane M from a spool to a winding machine which controls the continuous winding of the membrane M around the center tube at an angle to the axis of the center tube CT until a desired bundle diameter is achieved. The value of the angle (i.e., the pitch) may be held more or less constant until the length of the center tube CT is covered. Instead, the pitch may be decreased at ends of the center tube CT and increased away from the ends. In other words, the membrane M may be continuously wrapped around the center tube CT in the manner of a fishing reel. Thus, in this embodiment adjacent revolutions of the membrane M are parallel to one another but not parallel to the axis of the center tube CT. The membrane M may be retained in place by any technique known in the art of polymeric hollow fiber gas separation membranes for retention around a center tube. For example, the wound membrane M may be retained in place by tying down opposite ends of the membrane M portion of the bundle, for example, by using flexible metal wire or cut lengths of the fiber that are wound around the center tube CT. As another example, the membrane M may be retained in place by simply taping any loose ends of the membrane M to the remaining portion of the membrane M that is otherwise held in place by friction.

Figure 2:
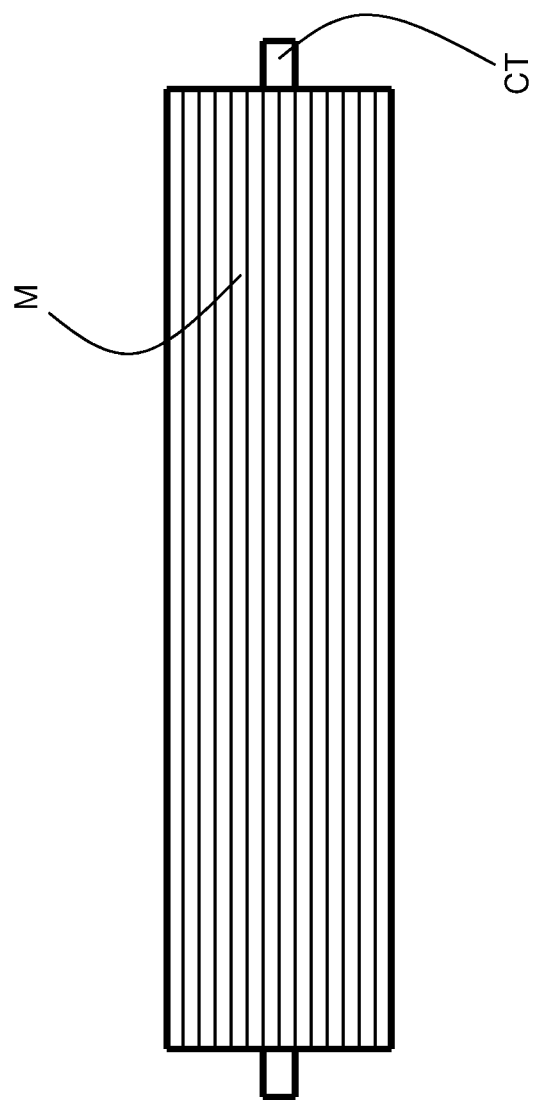
FIG. 2 is a side elevation view of another particular configuration of polymeric membrane cartridge.

In another embodiment and as shown in FIG. 2, instead of being wrapped around the porous center tube CT, polymeric membrane cartridge may be formed by arranging each of a plurality of green, polymeric, hollow fiber membranes M so as to extend in a direction parallel to the axis of the center tube CT. In other words, a collection of the membranes M of a roughly same length (more or less corresponding to a length of the center tube) are placed in parallel with one another on a flat support and fed towards the center tube CT (along a feed direction perpendicular to the axis of the center tube) where they are wrapped around the center tube. The membranes M may be retained in place by any technique known in the art of polymeric hollow fiber gas separation membranes. For example, the membranes M may be retained in place by taping down one or both edges of the membrane portion of the cartridge or wrapping a porous sheet around that portion of the cartridge. Thus, in this embodiment adjacent membranes M are both parallel to one another and also parallel to the axis of the center tube CT.

Regardless of the type of membrane M orientation with respect to the axis of the center tube CT, the cartridge has a length dimension that is two to seventy (typically ten to thirty) times its width or diameter dimension (perpendicular to an axis of the center tube CT).

The center tube is a tube open at at least one end and typically open at only one end. The center tube may have a circular cross-section, an oval cross-section, a rectangular cross-section or any other regular cross-sectional shape. Typically, it has a circular cross-section. The wall of the tube is perforated with apertures to either allow pyrolysis gas to flow from the green fiber(s) and enter into the interior of the center tube and flow out of the center tube away from the cartridge or to allow pyrolysis gas fed to the interior of the tube to exit the tube via the perforations and through the green fiber portion of the cartridge. The density, shape, and pattern (or lack of pattern) of the apertures are not limited. For a center tube with only one open end, the aperture density may be non-uniform along the length of the center tube (i.e., a gradient of density may be desired). For example, the aperture density may be relatively less over portions of the tube adjacent to the end (i.e., the feed end) of the tube receiving the fed pyrolysis gas and gradually increase in the length dimension towards the opposite end. This will allow for greater uniformity of pyrolysis gas flow across the green fiber(s), and consequently greater uniformity of purging of pyrolysis off-gases, along the length of the center tube by adjusting for the loss of pressure within the center tube along the entire length of the tube from the feed end to the opposite end. The material of the center tube is not limited except that it should not significantly soften at the peak temperature during pyrolysis of the green fibers. Typically, the center tube is metallic, for example, Inconel, stainless steel or other steel alloy. In one embodiment, the center tube is made of porous sintered metal.

As shown in FIGS. 3-4 and 7-8, in order to enhance the directional uniformity of the radial flow, the cartridge C may be placed within an outer shell OS. This allows the radially inward or outward flow $RF_I$, $RF_O$ to be more effectively channeled. For ease of assembly, the outer shell OS can be monolithic (i.e., a one piece tube) or a clam shell-type tube.

Figure 3:
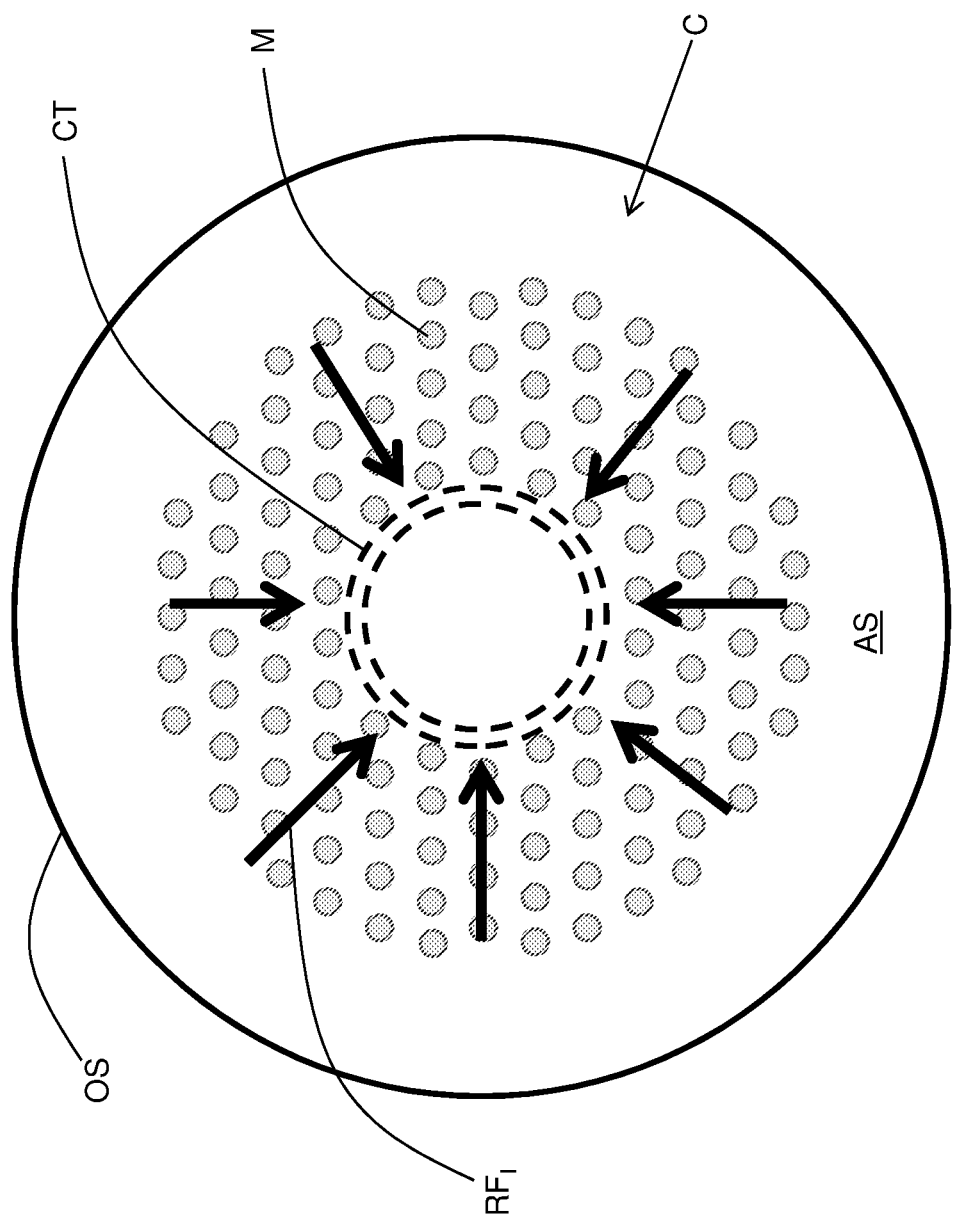
FIG. 3 is an illustration of a cross-section (taken perpendicular to the axis of the bundle) of a bundle disposed within an outer shell including a radially inward flow of pyrolysis gas where the fiber(s) and center tube are not enclosed within a shell.
Figure 4:
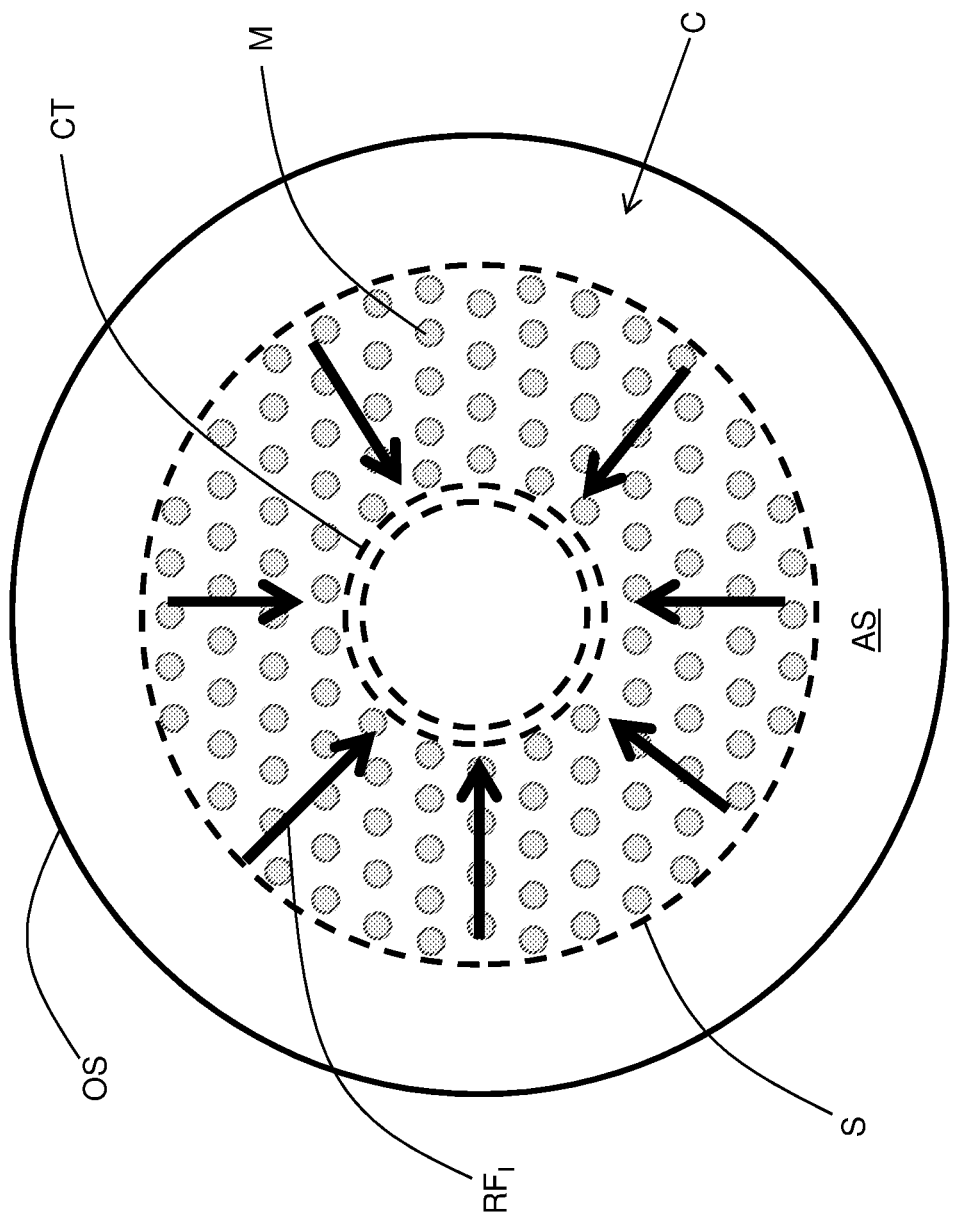
FIG. 4 is an illustration of a cross-section (taken perpendicular to the axis of the bundle) of a bundle disposed within an outer shell including a radially inward flow of pyrolysis gas where the fiber(s) and center tube are enclosed within a shell.
Figure 5:
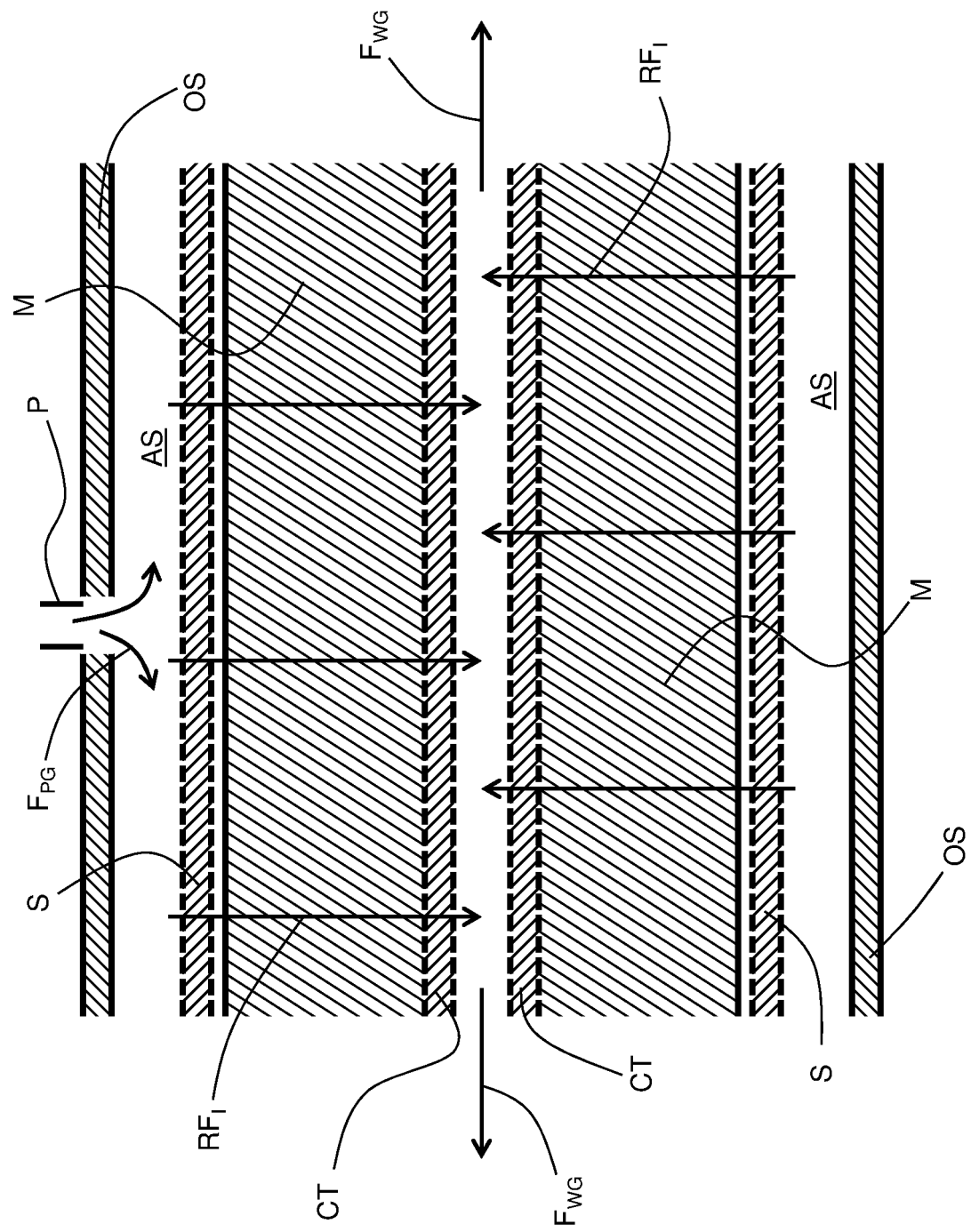
FIG. 5 is an illustration of a cross-section of a bundle (taken along its length) including a radially inward flow of pyrolysis gas where the pyrolysis gas is fed from a side port to an annular space between an outer shell and a porous inner shell and is withdrawn from the center tube.
Figure 6:
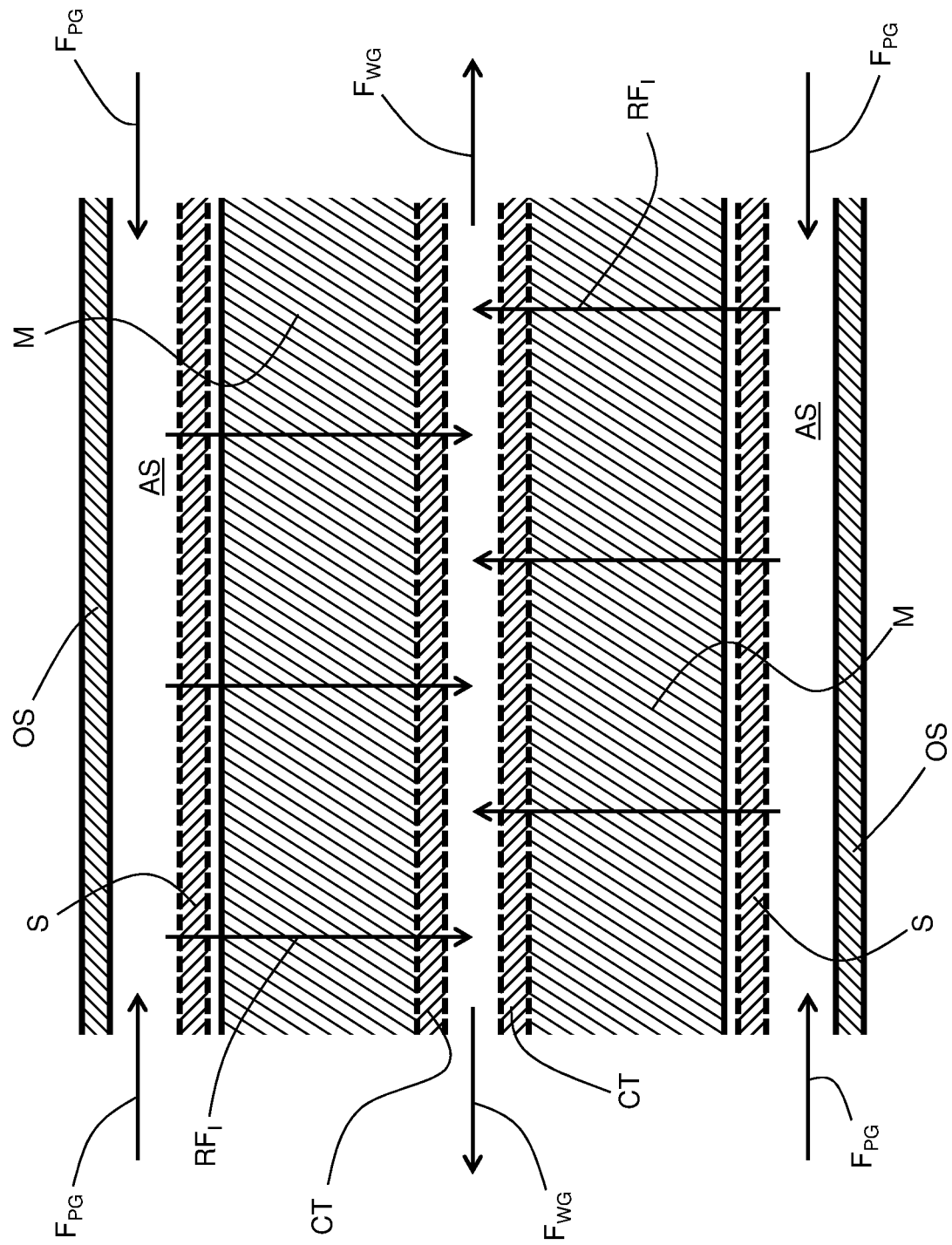
FIG. 6 is an illustration of a cross-section of a bundle (taken along its length) including a radially inward flow of pyrolysis gas where the pyrolysis gas is fed, from one or both ends of the bundle, to an annular space between an outer shell and a porous inner shell and is withdrawn from the center tube.

More particularly and as illustrated in FIGS. 3-4, in the case of a radially inward flow $RF_I$, the pressure of the pyrolysis gas fed into the annular space AS in between the outer shell OS and the cartridge C is maintained higher than a pressure inside the porous center tube CT. This pressure difference may be assisted with application of a vacuum to the interior of the center tube CT. Also, removal of the combined pyrolysis gas and pyrolysis off-gases may be enhanced through use of a sweep gas that flows through the interior of the center tube CT. Those skilled in the art will understand that, in the embodiment including a radially inward flow $RF_I$ of pyrolysis gas, pyrolysis gas fed into the annular space AS flows across the fiber(s) M in a radial direction towards the center tube CT and subsequently flows through apertures formed in the center tube CT where it is withdrawn from the cartridge C.

Figure 7:
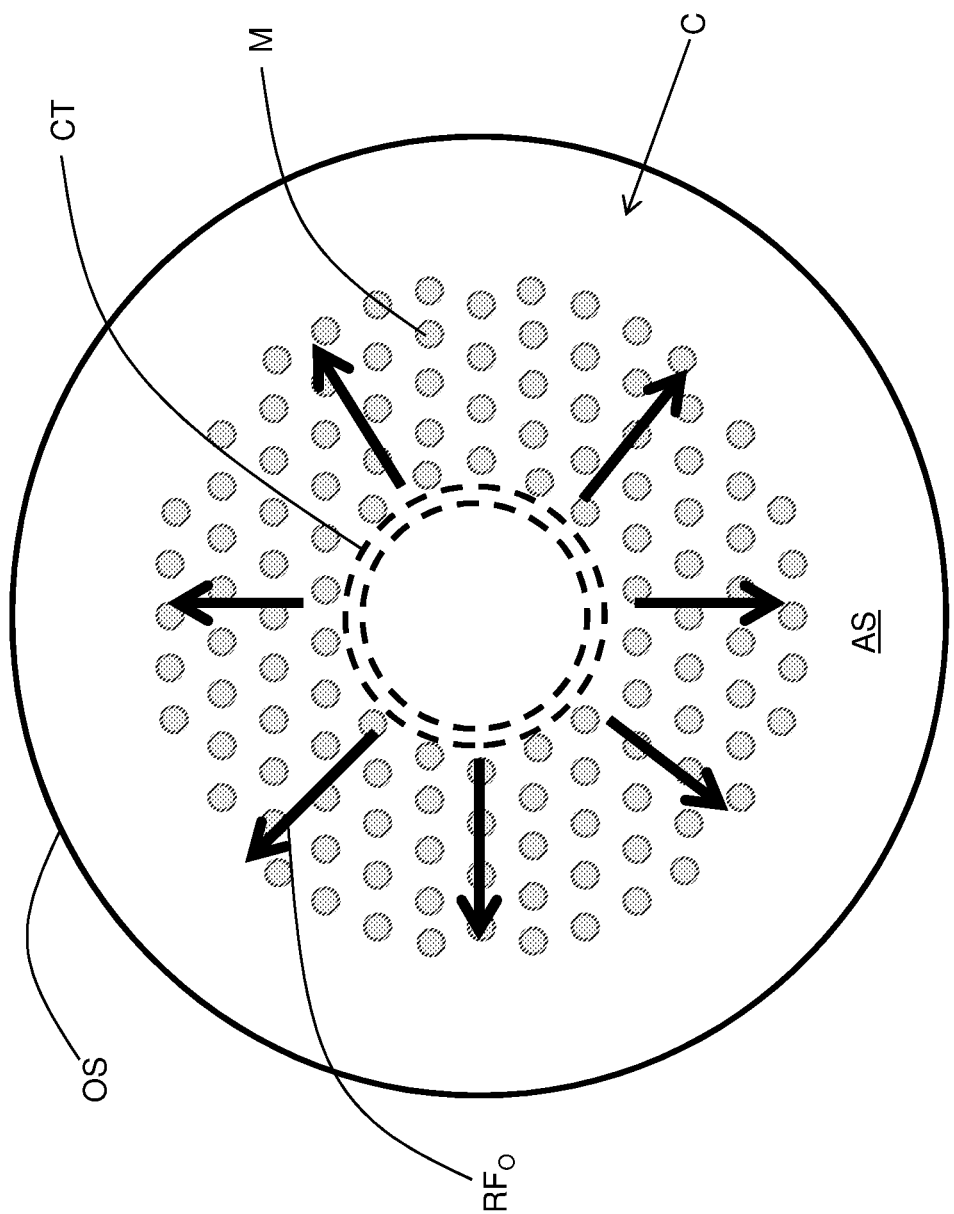
FIG. 7 is an illustration of a cross-section (taken perpendicular to the axis of the bundle) of a bundle disposed within an outer shell including a radially outward flow of pyrolysis gas where the fiber(s) and center tube are not enclosed within a shell.
Figure 8:
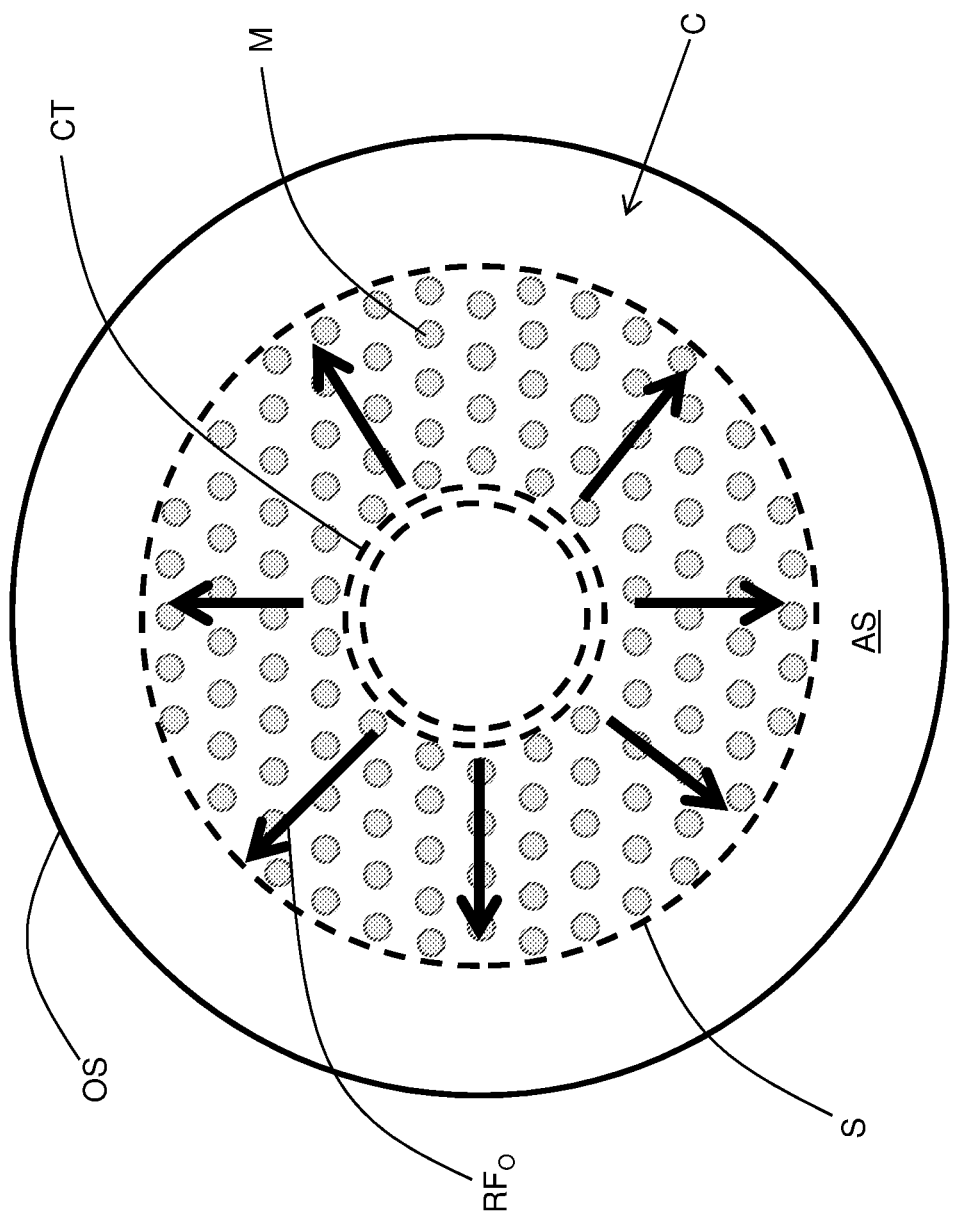
FIG. 8 is an illustration of a cross-section (taken perpendicular to the axis of the bundle) of a bundle disposed within an outer shell including a radially outward flow of pyrolysis gas where the fiber(s) and center tube are enclosed within a shell.
Figure 9:
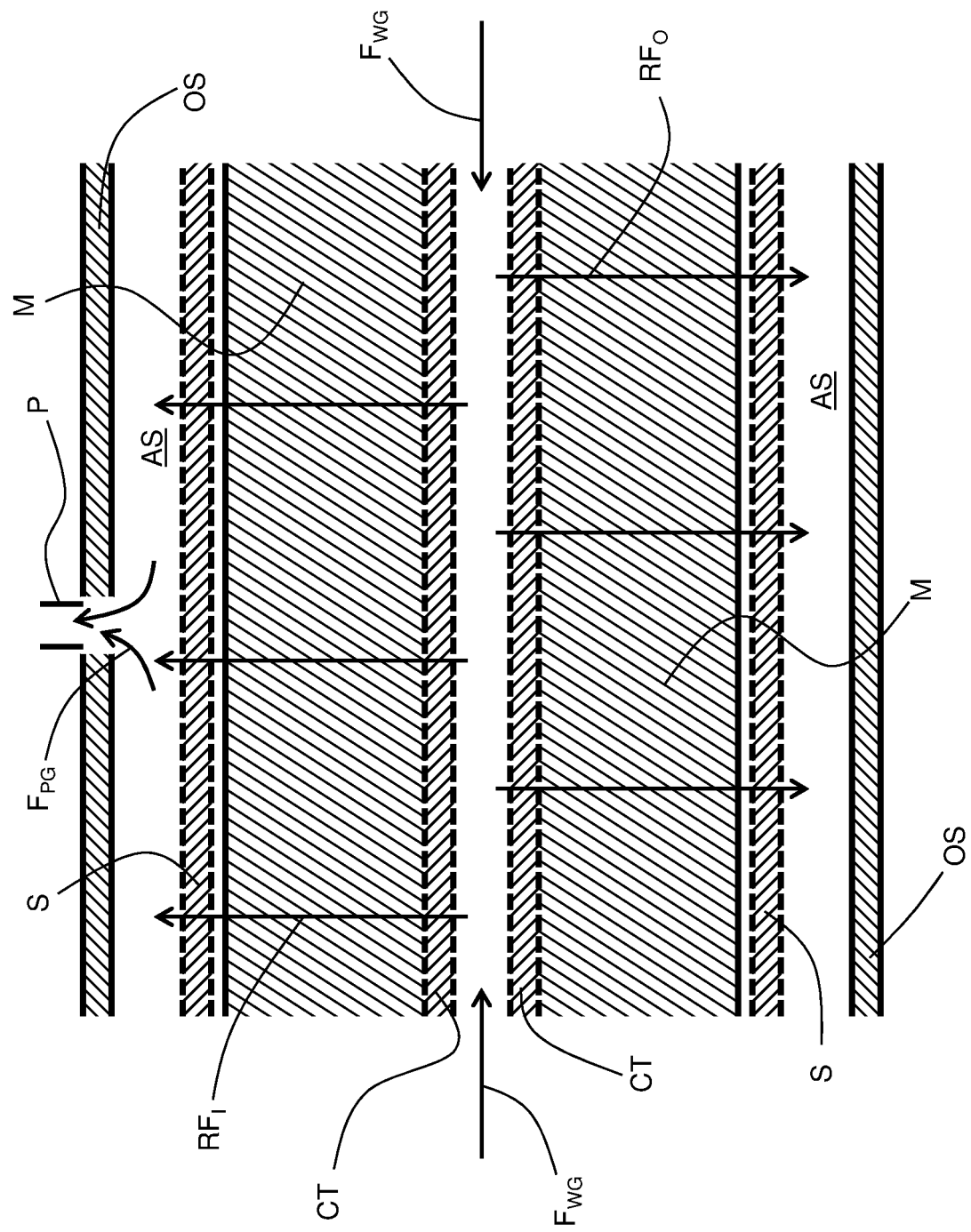
FIG. 9 is an illustration of a cross-section of a bundle (taken along its length) including a radially outward flow of pyrolysis gas where the pyrolysis gas is fed into the center tube and withdrawn from an annular space between an outer shell and a porous inner shell via a side port.
Figure 10:
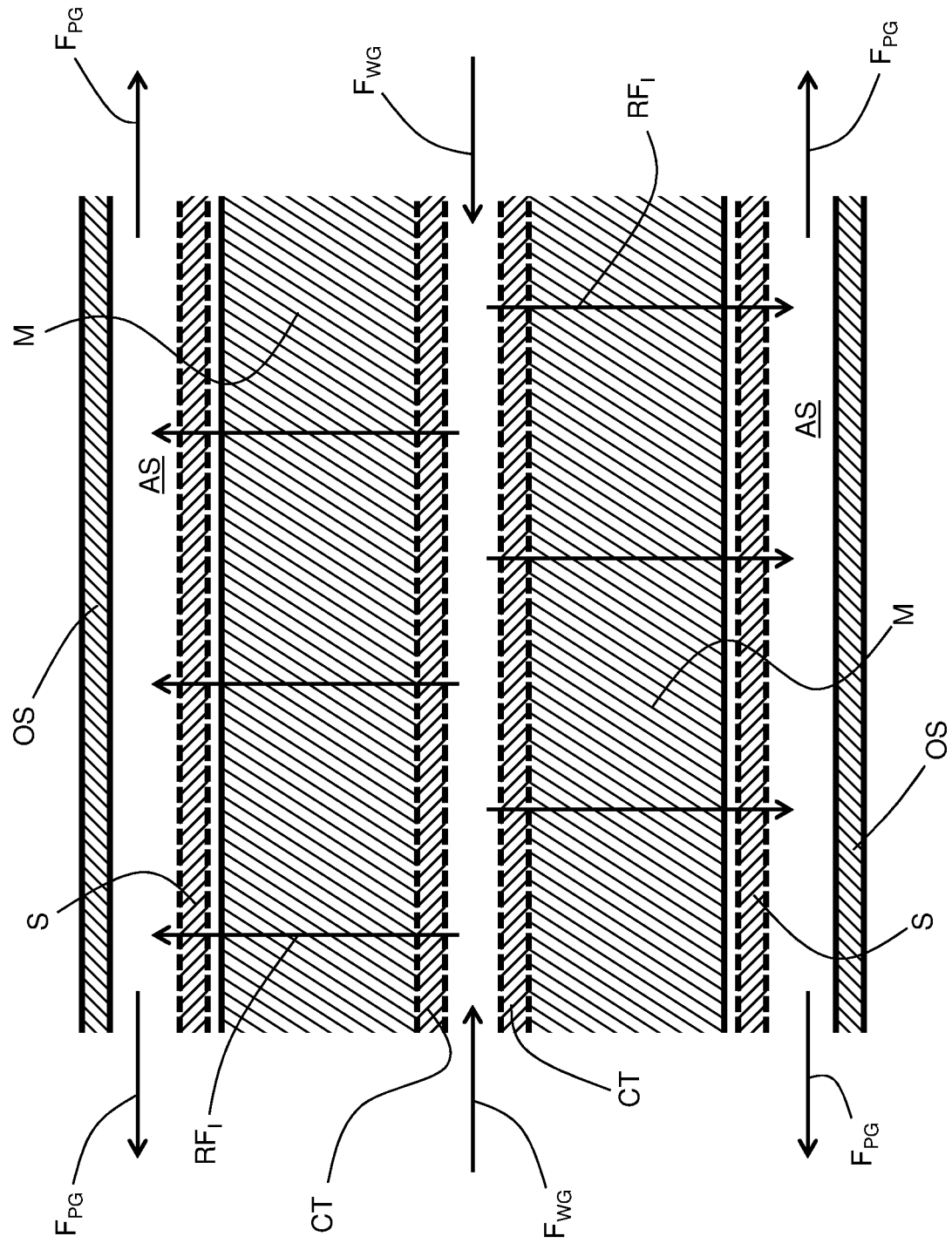
FIG. 10 is an illustration of a cross-section of a bundle (taken along its length) including a radially outward flow of pyrolysis gas where the pyrolysis gas is fed to the center tube and is withdrawn from an annular space between an outer shell and a porous inner shell via one or both ends of the bundle.

Conversely and as illustrated in FIGS. 7-8, in the case of a radially outward flow $RF_O$, the pressure of the pyrolysis gas fed into the interior of the center tube CT is maintained higher than that of the annular space AS with the pressure difference again being optionally assisted with application of a vacuum to the annular space AS. Also, removal of the combined pyrolysis gas and pyrolysis off-gases may be enhanced through use of a sweep gas that flows through the annular space AS. Those skilled in the art will understand that, in the embodiment including a radially outward flow $RF_O$ of pyrolysis gas, pyrolysis gas fed into the interior of the center CT flows through apertures formed therein and subsequently across the fiber(s) M in a radial direction and into the annular space AS where it is withdrawn from the cartridge C.

In order to avoid recontamination of the fiber(s) M with the pyrolysis off-gas entrained within the pyrolysis gas, after withdrawal from the cartridge C, the combined off-gas and pyrolysis gas is removed from the pyrolysis chamber.

As shown in FIGS. 3 and 7, an outer surface of the cartridge C may be kept unconstrained so that nothing comes between the outer surface of the bundle and the outer shell.

Alternatively and as illustrated in FIGS. 4 and 7, the bundle may be enclosed within a sleeve S that is typically disposed co-axial with the center tube CT and has a same cross-sectional shape as the center tube CT. The sleeve is porous in order to allow the pyrolysis gas to flow to (from) the annular space AS from (to) the center tube CT. The sleeve may be rigid or flexible. For example, the sleeve may be made of a rigid cylinder of sintered metal or a rigid metal cylinder through which many holes have been drilled. The sleeve may instead be made of a flexible mesh material or woven or non-woven fabric. In either case, the sleeve helps retain the fiber(s) M close to the center tube CT during pyrolysis. This may be advantageous in case the fiber(s) M moves/shifts due to the change in composition and the expansion or contraction due to increased or decreased temperature. While the material of the sleeve S and center tube CT are not limited, typically it is made of a metal (e.g., Inconel, stainless steel, or other steel alloy), carbon fiber, a polymeric material having a high melting temperature, high softening temperature, and/or high pyrolysis temperature, such as Kevlar or Nomex. In order to reduce any outsized mismatch between the coefficients for thermal expansion (CTE) of the CMS membranes, the center tube CT, and the sleeve S, the center tube CT and/or the sleeve S may be made of a low CTE alloy such as Invar (containing ~36% Ni in iron). Ideally, the sleeve S is able to undergo moderate shrinkage during pyrolysis so as to maintain a relative tightness of the fibers onto the center tube CT.

With regard to the embodiment of FIG. 4, one of ordinary skill in the art will recognize that the aperture size and density of the center tube CT may be increased as needed in order to avoid creation of too much of a pressure barrier for easy exit of the pyrolysis gas from the fiber(s) M and into the center tube CT interior. Similarly and with regard to the embodiment of FIG. 8, one of ordinary skill in the art will recognize that the porosity of the sleeve S may be increased as needed in order to avoid creation of too much of a pressure barrier for easy exit of the pyrolysis gas from the fiber(s) M and into the annular space AS.

Optionally, the fiber(s) M is kept close to the center tube CT by use of a spiral spring. Such a spring is initially relaxed by a mechanical constraint to allow insertion of the bundle B into it. After appropriate positioning of the bundle B, the mechanical constraint used to relax the spring is removed so that the spring moderately compresses the fiber(s) M of the bundle towards the center tube CT. The spring can be made of metal, polymer or any other suitable material.

Figure 11:
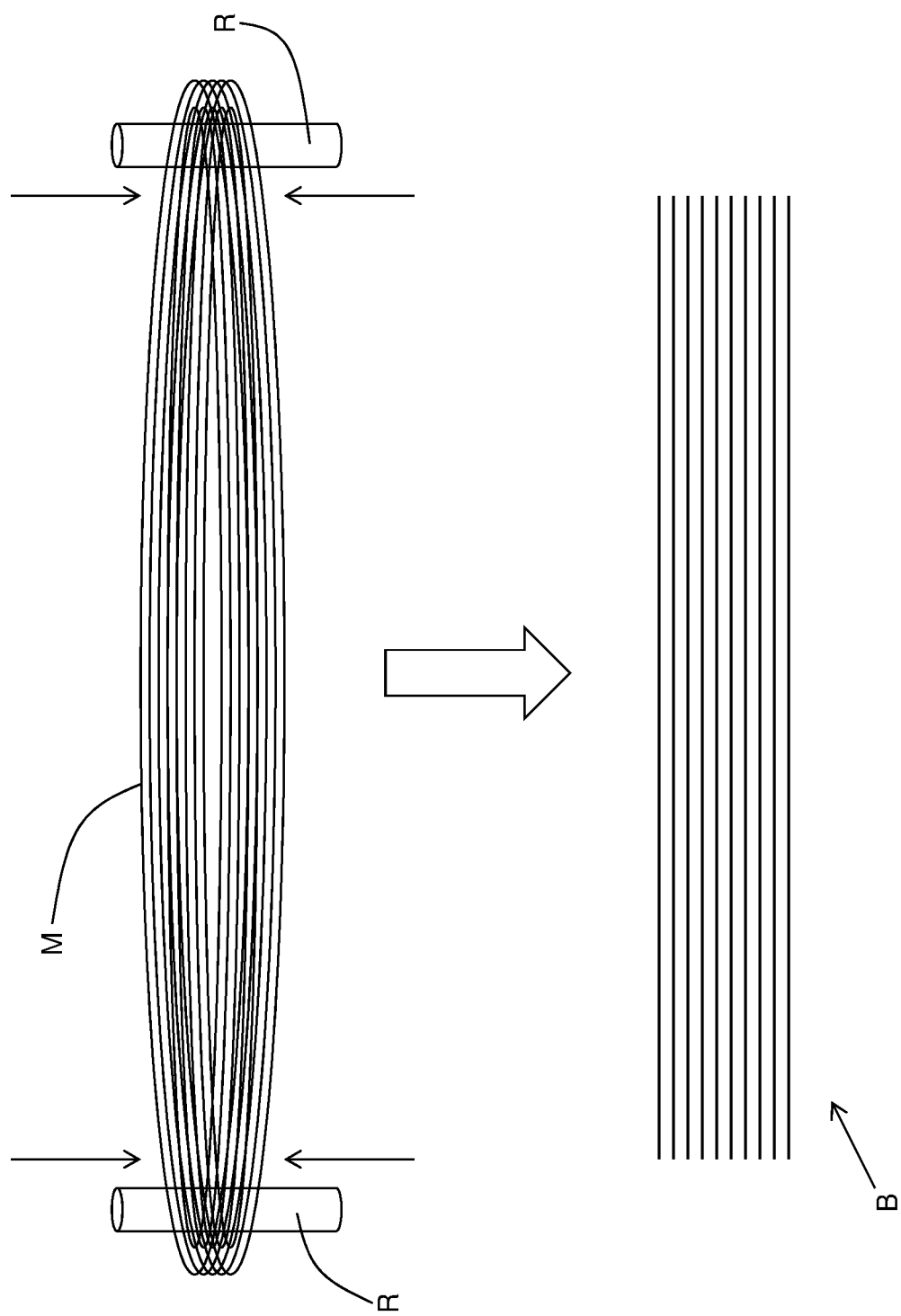
FIG. 11 is a schematic view of polymeric membrane bundle formation.
Figure 12:
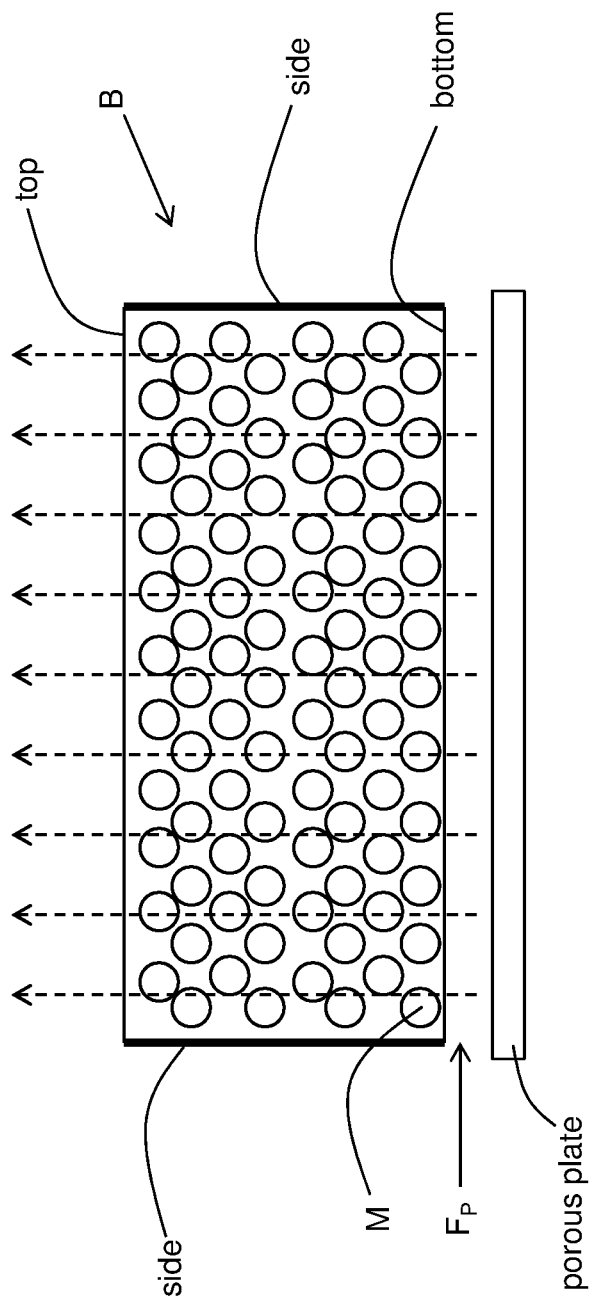
FIG. 12 is a cross-sectional illustration of pyrolysis of a bundle of polymeric membranes including a flow pyrolysis gas perpendicular to the length of the bundle.

While the way in which the configuration of a bundle of polymeric membranes is achieved is not limited, typically and as shown in FIG. 11, a continuous length of green, polymeric hollow fiber membrane M is skeined onto opposed rods R and cut along the arrows to form the bundle B. While those skilled in the art will recognize that the way in which the bundle may be contained during pyrolysis and the way in which the pyrolysis gas may be introduced so as to flow perpendicular to the length direction of the bundle, typically and as shown in FIG. 12, the bundle B (each of the membranes M being viewed end-on) is placed within a container having solid sides, a porous top, and a porous bottom through which a perpendicular flow $F_P$ of pyrolysis gas travels upwardly through the bottom, through the bundle and out the top of the container. This flow pattern is enhanced by being restrained by the solid sides of the container.

Similar to the cartridge embodiment, the bundle also has a length dimension that is two to seventy (typically ten to thirty) times its width or diameter dimension.

The polymeric material(s) of the separation layer of the green, polymeric, hollow fiber membrane(s) (also known as green fiber) is not limited. Rather, the polymeric material(s) is typically selected based upon the desired separation at stake and the performance characteristics (such as permeance and selectivity) and mechanical properties (such as elongation at break, coefficient of thermal expansion, and tensile strength) of the hollow fiber CMS membrane(s) resulting from pyrolysis of the green fiber. In the case of a composite core/sheath configuration for the green fiber, the polymeric material(s) of the core is also not limited. Typically, it is selected based upon the mechanical properties of the green fiber or upon the mechanical properties of the CMS hollow fiber membrane. The core of the green fiber may also include filler and/or other materials such as zeolite, silica, high-temperature polymer, etc.

The green fiber may be commercially obtained or may be made by any technique known in the field of hollow fiber membranes. Typically, it is made by either of two techniques. First, a composite fiber may be made by co-extrusion of the core (for mechanical strength) and sheath (as the separation layer) in the shape of a hollow fiber followed by phase inversion/coagulation of the nascent hollow fiber. Second, a composite fiber may be made by extrusion of the core (for mechanical strength) in the shape of a hollow fiber followed by coagulation of the nascent hollow fiber, and coating of the coagulated hollow fiber with the polymeric materials making up the separation layer. Third, a monolithic fiber may be made by extrusion of the core without a sheath in the shape of a hollow fiber followed by phase inversion/coagulation of the nascent hollow fiber, where an outer surface of the core makes up the separation layer.

With materials and illustrative structures being described, we will now describe the pyrolysis process.

The composition of the pyrolysis gas is not limited. Any pyrolysis gas known in the field of CMS membranes may be used. Typically, the pyrolysis gas comprises small amounts (i.e., 2-40 ppm) of $O_2$ with a balance of inert gas such as $N_2$, Ar, Kr, He, or mixtures thereof. Alternatively, the pyrolysis gas comprises or essentially consists of the afore-mentioned inert gas with substantially no $O_2$, in which case an $O_2$ getter may be used to remove any trace amounts of $O_2$ from the pyrolysis gas.

While the pyrolysis temperature may range from 500-1,000° C., typically it is between about 450-800° C. As one particular example, the pyrolysis temperature may be maintained between about 500-550° C. The pyrolysis includes at least one ramp step whereby the temperature is raised over a period of time from an initial temperature to a predetermined temperature at which the polymer is pyrolyzed and carbonized. The ramp rate may be constant or follow a curve. The pyrolysis may optionally include one or more pyrolysis soak steps (i.e., the pyrolysis temperature may be maintained at a particular level for a set period of time) in which case the soak period is typically between about 1-10 hours or optionally from about 2-8 or 4-6 hours.

An illustrative heating protocol may include starting at a first set point (i.e., the initial temperature) of about 50° C., then heating to a second set point of about 250° C. at a rate of about 3.3° C. per minute, then heating to a third set point of about 535° C. at a rate of about 3.85° C. per minute, and then a fourth set point of about 550° C. at a rate of about 0.25 degrees centigrade per minute. The fourth set point is then optionally maintained for the determined soak time. After the heating cycle is complete, the system is typically allowed to cool while still under vacuum or in the controlled atmosphere provided by purging with the low oxygen inert purge gas.

Another illustrative heating protocol (for final temperatures up to 550° C. has the following sequence: 1) ramp rate of 13.3° C./min from 50° C. to 250° C.; 2) ramp rate of 3.85° C./min from 250° C. to 15° C. below the final temperature ($T_{max}$); 3) ramp rate of 0.25° C./min from $T_{max}$–15° C. to $T_{max}$; 4) soak for 2 h at $T_{max}$.

Yet another illustrative heating protocol for final temperatures of greater than 550° C. and no more than 800° C. has the following sequence: 1) ramp rate of 13.3° C./min from 50° C. to 250° C.; 2) ramp rate of 0.25° C./min from 250° C. to 535° C.; 3) ramp rate of 3.85° C./min from 535° C. to 550° C.; 4) ramp rate of 3.85° C./min from 550° C. to 15° C. below the final temperature $T_{max}$; 5) ramp rate of 0.25° C./min from 15° C. below the final temperature $T_{max}$ to $T_{max}$; 6) soak for 2 h at $T_{max}$.

Still another heating protocol is disclosed by U.S. Pat. No. 6,565,631. Its disclosed heating protocol is incorporated herein by reference.

After the heating protocol is complete, the membrane is allowed to cool in place to at least as low as 40° C. while still under vacuum or in the inert gas environment.

After pyrolysis of the green fiber(s), the center tube may be removed from the CMS membrane fiber(s). Otherwise, the center tube may be retained in place for use as a collection tube for collecting the permeate or non-permeate gas during operation of the completed CMS membrane module (that incorporates the combined CMS membrane(s) and center tube). For example, it may be used for collecting the permeate gas or the non-permeate gas as disclosed in U.S. Pat. No. 4,670,145, the contents of which are incorporated by reference.

We will now describe completion of a CMS membrane module including the pyrolyzed CMS membrane(s).

In the case where the center tube is not retained as a collection tube, the bundled pyrolyzed fiber(s) are next potted with one or two tubesheets. First, open bores of the fiber(s) adjacent the end to which tubesheet is to be applied are temporarily plugged in order to prevent entry of the material used to form the tubesheet. Next, a curable polymeric material, such an epoxy, is applied to one end of the fiber bundle (in the case of a so-called "single-ender" type module) or to both ends of the fiber bundle (in the case of a so-called "double-ender"). The curable polymeric material is then allowed to cure/harden. An outer end of the tubesheet(s) including the cured/hardened polymeric material and the plugged ends of the fiber(s) are then machined away to expose the bores of the fibers at one end (for a single-ender) or at both ends (for a double-ender). The circumferential surfaces of the tubesheets are also machined in order to provide a suitable sealing surface including a groove for receiving an o-ring. The bundle (which is now provided with a tubesheet or tubesheets) is placed within a pressure vessel having suitable feed gas, permeate, and non-permeate ports for introducing the feed gas and withdrawing the permeate and non-permeate gases, respectively. The afore-mentioned o-ring assists in providing a satisfactory seal in between the tubesheet and pressure vessel.

Typically, all or most of metallic parts used in the CMS membrane module are electropolished and/or passivated prior to being used in order to minimize contamination (e.g., lubricants typically present on stock tube surfaces).

In operation, the gas mixture to be separated/purified is fed to the CMS membrane module via the feed gas port. A permeate gas is withdrawn from the permeate port. A non-permeate gas is withdrawn from the non-permeate port that is deficient in at least one gas relative to the gas mixture. Depending upon whether a sweep is optionally used, the permeate gas may or may not be enriched in at least one gas relative to the gas mixture.

EXAMPLE

Each of three polymeric membrane bundles (each of which contained 65 green, polymeric hollow fiber membranes made of 6FDA/BPDA:DAM) was placed within its own closed cylindrical vessel provided with an inlet and an outlet. The three vessels were placed in fluid communication with each other, in series, by connecting the outlet of the upstream-most vessel within the inlet of the middle vessel and connecting the outlet of the middle vessel with the inlet of the downstream-most vessel.

The connected vessel were placed within a pyrolysis chamber. A 2.5 L/min flow of $N_2$ was fed to the inlet of the upstream-most vessel and discharged from the connected vessel at the outlet of the downstream-most vessel so as to provide an axial flow of the $N_2$ flow along the lengths of the bundles. The green, polymeric hollow fiber membranes disposed within the three connected vessels were then pyrolyzed (with the axial $N_2$ purge gas as described above) by heating the pyrolysis chamber according to the following temperature profile:

heat from room temperature to 250° C. at a rate of 13° C./min
heat from 250° C. to 400° C. at a rate of 3.8° C./min
heat from 400° C. to 600° C. at a rate of 1° C./min
maintain the temperature at 600° C. for 6 hours
cool to room temperature Following pyrolysis, three gas separation CMS membrane modules were made from the three bundles of hollow fiber CMS membranes. The $CO_2$ permeance and the $CO_2/N_2$ selectivity for each of the three modules was then obtained using a gas mixture of 10% $CO_2$ in $N_2$. The data are reported in Table 1:

TABLE 1

$CO_2$ permeance and $CO_2/N_2$ selectivity for in-series pyrolysis

|  | $CO_2$ permeance (GPU) | $CO_2/N_2$ selectivity |
|---|---|---|
| CMS module made from fibers pyrolyzed in upstream vessel | 407 | 65 |
| CMS module made from fibers pyrolyzed in middle vessel | 529 | 56 |
| CMS module made from fibers pyrolyzed in downstream vessel | 558 | 44 |

As seen in Table 1, there is a systematic decline in the gas separation performance going from upstream to downstream. We believe that the differences in permeance and selectivity are due to the lesser degree of interactions between the pyrolysis off-gases and the CMS hollow fiber membranes pyrolyzed in the upstream-most vessel and the greater degree of interactions between the pyrolysis off-gases and the CMS hollow fiber membranes pyrolyzed in the downstream-most vessel. These findings may be analogized to gas separation performance in a single gas separation CMS membrane module whose CMS hollow fiber membranes were produced by subjecting them to an axial flow of pyrolysis gas similar to how conventional pyrolysis techniques are carried out.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for manufacturing a plurality of hollow fiber CMS membranes, comprising the steps of:
    heating, in a pyrolysis chamber, a bundle of polymeric membranes comprising a plurality of green, polymeric hollow fiber membranes oriented so that first and second ends of the plurality of green, polymeric hollow fiber membranes are disposed at first and second ends of the bundle, the bundle of polymeric membranes having a length dimension that is greater than its width and thickness dimensions, said heating step being performed at a temperature and time duration sufficient to pyrolyze the plurality of green, polymeric hollow fiber membranes; and
    directing a flow of pyrolysis gas during said heating step through said bundle in a direction perpendicular to the length direction of the bundle, wherein performance of said heating step results in production of pyrolysis off-gases and said flow of pyrolysis gas sweeps the pyrolysis off-gases away from the plurality of green, polymeric hollow fiber membranes.

2. The method of claim 1, wherein the bundle is formed by skeining a continuous length of a green, polymeric hollow fiber membrane onto two rods and cutting the skeined green, polymeric hollow fiber membrane adjacent the two rods.

3. The method of claim 1, wherein, during performance of said step of directing, the bundle is contained within a container having solid sides, a porous top, and a porous bottom.

4. The method of claim 1, wherein the bundle has a length dimension that is two to seventy times its width or diameter dimension.

5. The method of claim 1, wherein the bundle has a length dimension that is ten to thirty times its width or diameter dimension.

6. The method of claim 1, wherein the pyrolysis gas comprises 2-40 ppm of $O_2$ with a balance of inert gas.

7. The method of claim 1, wherein the pyrolysis gas essentially consists of an inert gas with substantially no $O_2$.

8. The method of claim 1, wherein the bundle is heated in the pyrolysis chamber up to a temperature from 500-1,000° C.

9. The method of claim 1, wherein the bundle is heated in the pyrolysis chamber up to a temperature from 450-800° C.

10. The method of claim 1, wherein the bundle has a length dimension that is ten to thirty times its width or diameter dimension and the bundle is heated in the pyrolysis chamber up to a temperature from 450-800° C.

11. A method of manufacturing a hollow fiber CMS membrane module, comprising the steps of:
    heating, in a pyrolysis chamber, a bundle of polymeric membranes comprising a plurality of green, polymeric hollow fiber membranes oriented so that first and second ends of the plurality of green, polymeric hollow fiber membranes are disposed at first and second ends of the bundle, the bundle of polymeric membranes having a length dimension that is greater than its width and thickness dimensions, said heating step being performed at a temperature and time duration sufficient to pyrolyze the plurality of green, polymeric hollow fiber membranes; and
    directing a flow of pyrolysis gas during said heating step across said bundle in a direction perpendicular to the length direction of the bundle, wherein performance of said heating step results in production of pyrolysis off-gases and said flow of pyrolysis gas sweeps the pyrolysis off-gases away from the plurality of green, polymeric, hollow fiber membranes;
    forming one or more tubesheets on a bundle of hollow fiber CMS membranes resulting from said steps of heating and directing; and
    following said forming step, placing the bundle of hollow fiber CMS membranes inside a pressure vessel having a feed port, a permeate port, and a non-permeate port.

* * * * *